May 16, 1961   S. L. BENNETT   2,984,090
SHIELD FOR DRIVE SHAFT
Filed Dec. 9, 1958

INVENTOR
Samuel L. Bennett

BY

ATTORNEY

United States Patent Office 2,984,090
Patented May 16, 1961

2,984,090
SHIELD FOR DRIVE SHAFT
Samuel L. Bennett, P.O. Box 260, Ralls, Tex.
Filed Dec. 9, 1958, Ser. No. 779,123
3 Claims. (Cl. 64—4)

This invention relates to a shield for a drive shaft, and it concerns more particularly, in combination with a drive shaft operatively connecting an internal combustion engine to apparatus driven thereby, a protective shield for the drive shaft designed to protect life and property upon the occurrence of a break in the drive shaft while in operation.

In the irrigation of arid lands it is customary to drive rotary water pumps, operating in wells, by means of internal combustion engines of the type which are ordinarily used in automobiles. The engine is usually connected to the pump by a drive shaft having a universal joint at each end.

In operation, one or the other of the universal joints connecting the drive shaft to the engine and the pump, respectively, may break, whereby the drive shaft, disconnected at one end, continues to turn wildly uncontrolled, with a swinging or wobbling movement, either by the action of the engine or, in reverse direction, due to the torque applied thereto by fluid pressure within the well. The free swinging drive shaft represents a hazard to personnel, as well as a source of damage to the equipment.

An object of the invention is to provide, in combination with a drive shaft operatively connecting an internal combustion engine to apparatus driven thereby, the drive shaft having universal joints at each end connecting it to the engine and the apparatus driven thereby, respectively, a protective shield at least partially enclosing the drive shaft, and a loosely fitting bearing surrounding the drive shaft intermediate its ends, and rigidly connected to the shield, capable of confining the drive shaft and limiting its wobbling movement upon the occurrence of a break therein.

Another object of the invention is to provide, in combination with an internal combustion engine, a well pump driven by the engine, and a drive shaft operatively connecting the engine to the pump, the drive shaft having universal joints at each end connecting it to the engine and the pump, respectively, a downwardly facing semi-cylindrical shield, open at its ends, arranged concentrically relative to the drive shaft and partially enclosing it, the shield being rigidly and removably connected at its ends to the engine and the pump, respectively, and a loosely fitting bearing surrounding the drive shaft intermediate its ends, and rigidly connected to the shield in spaced relation thereto, capable of confining the drive shaft and limiting its wobbling movement upon the occurrence of a break therein.

Another object of the invention is to provide, in the structure described, a cut-off switch on the shield, responsive to any wobbling movement of the drive shaft, for use in interrupting the ignition circuit of the engine.

The invention will be readily understood by referring to the following description and the accompanying drawing, in which.

Figure 1:
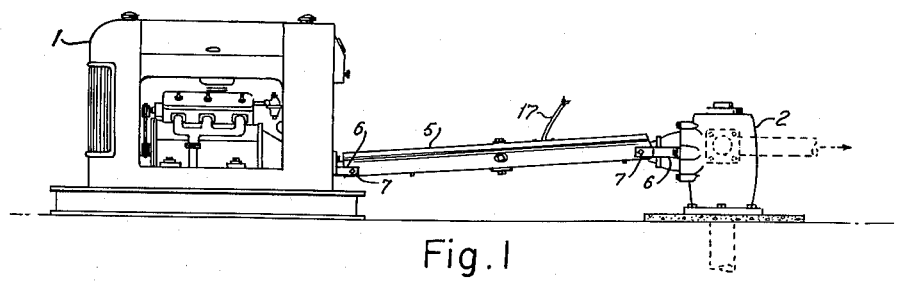
Figure 1 is a side elevational view showing an internal combustion engine, a well pump, and a protective shield embodying the invention in its operative position relative to a drive shaft operatively connecting the engine to the pump.

Referring to the drawing, the numeral 1 designates an internal combustion engine, and the numeral 2 indicates a well pump which is driven by the engine 1. A drive shaft 3 operatively connects the engine 1 to the pump 2. The drive shaft 3 has universal joints 4 at each end connecting it to the engine 1 and the pump 2, respectively.

Figure 2:
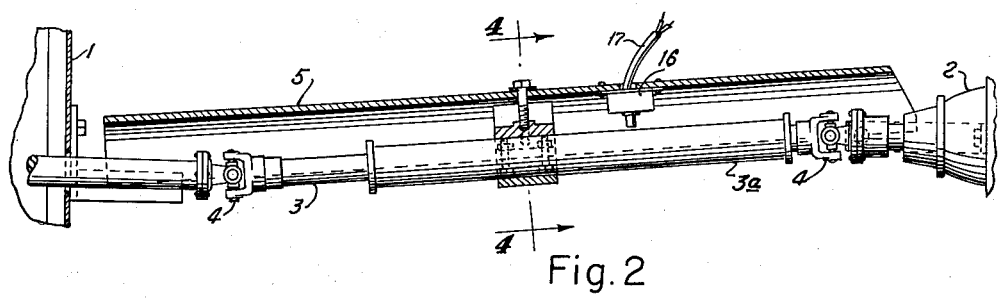
Figure 2 is a fragmentary elevational view on an enlarged scale, partly in section taken on a median line.
Figure 3:
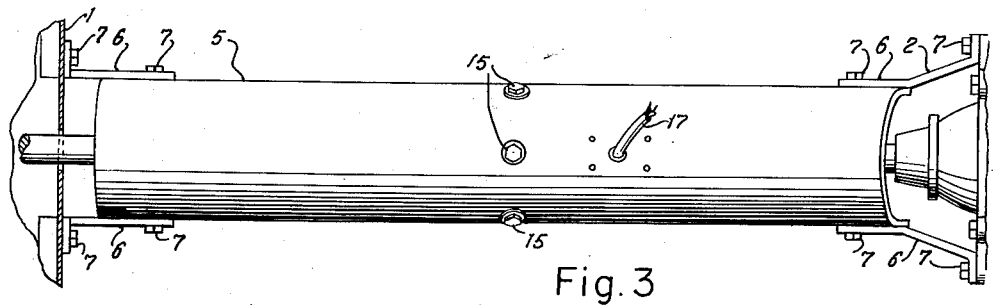
Figure 3 is a top plan view.

Embracing the shaft 3 is a sleeve 3a which is shorter than the shaft, as shown in Figure 2, and one end thereof is adjacent to one of the universal joints 4.

A downwardly facing semi-cylindrical shield 5, which is open at its ends, is arranged concentrically relative to the drive shaft 3 and partially encloses it. The shield 5 is rigidly and removably connected at its ends, by metal straps 6 and bolts 7, to the engine 1 and the pump 2, respectively.

Figure 4:
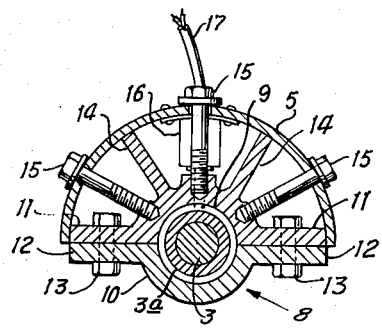
Figure 4 is a sectional elevational view taken on the lines 4—4 of Figure 2.

A loosely fitting bearing 8 surrounds the drive shaft 3 intermediate its ends, and the sleeve 3a thereon. The bearing 8 is rigidly connected to the shield 5, in spaced relation thereto, as hereinafter described, and is capable of confining the drive shaft 3, with the sleeve 3a, and limiting its wobbling movement upon the occurrence of a break therein. Should either universal joint 4 become weakened and break the sleeve 3a will restrain the shaft 3 from wobbling since the sleeve 3a is embraced by the bearing 8, as shown in Figures 2 and 4.

The bearing 8 consists of a diametrically split collar having semi-circular upper and lower sections, numbered 9 and 10, respecitvely. The sections 9 and 10 have mutually opposed flanges 11 and 12, respectively, which extend radially outwardly therefrom in opposite directions and are connected by bolts 13 whereby the sections 9 and 10 are clamped about the drive shaft 3. The inside diameter of the bearing 8 is somewhat larger than the diameter of the drive shaft 3, so that the bearing 8 is normally spaced radially from the drive shaft 3.

The inside diameter of the shield 5 is substantially larger than the outside diameter of the bearing 8, and the shield 5 is spaced radially from the upper section 9 a distance corresponding to the radial length of the flanges 11. The shield 5 is additionally spaced apart from the upper section 9 by a pair of ribs 14, which are formed integrally with the upper section 9 and extend radially outwardly therefrom, the ribs 14 being spaced circumferentially relative to each other and relative to the flanges 11.

The shield 5 is secured to the upper section 9 by a plurality of radially extending studs 15, which are passed through circumferentially spaced openings provided therefor in the shield 5, intermediate the flanges 11 and the ribs 14, and are threadedly secured in corresponding openings provided therefor in the periphery of the upper section 9.

A cut-off switch, which may be of any suitable construction and is indicated generally by the numeral 16, is mounted on the shield 5, and is so positioned relative to the drive shaft 3 that it is responsive to any wobbling movement thereof. The switch 16 advantageously may be connected in a secondary electrical circuit (not shown) by conductors 17 which includes means capable of interrupting the ignition circuit of the engine 1. The switch 16 preferably is positioned immediately adjacent the bearing 8, and may be combined therewith if desired.

The invention may be modified in various ways without departing from the spirit and scope thereof.

What is claimed is:

1. In combination with an internal combustion engine, a well pump driven by the engine, and a drive shaft operatively connecting the engine to the pump, the drive shaft having universal joints at each end connecting it to the engine and the pump, respectively, a rigid sleeve embracing the drive shaft, a downwardly facing semi-cylindrical shield, open at its ends, arranged concentrically relative to the drive shaft and partially enclosing it, the shield being rigidly and removably connected at its ends to the engine and the pump, respectively, and a loosely fitting bearing surrounding the said sleeve and the drive shaft intermediate its ends, and rigidly connected to the shield in spaced relation thereto, capable of confining the drive shaft and limiting its wobbling movement upon the occurrence of a break therein.

2. The structure of claim 1, and a cut-off switch on the shield, responsive to any wobbling movement of the drive shaft and the sleeve thereon, for use in interrupting the ignition circuit of the engine.

3. The structure of claim 1, the inside diameter of the bearing being somewhat larger than the diameter of the drive shaft and said sleeve, so that the bearing is normally spaced radially from the drive shaft.

References Cited in the file of this patent

UNITED STATES PATENTS

| | | |
|---|---|---|
| 2,027,329 | Van Ranst | Jan. 7, 1936 |
| 2,443,035 | Hardy | June 8, 1948 |
| 2,652,700 | Seibel | Sept. 22, 1953 |
| 2,699,196 | Cozzo | Jan. 11, 1955 |
| 2,904,974 | Libby | Sept. 22, 1959 |